(No Model.)
E. N. WOOD.
AXLE BOX.
No. 483,372. Patented Sept. 27, 1892.
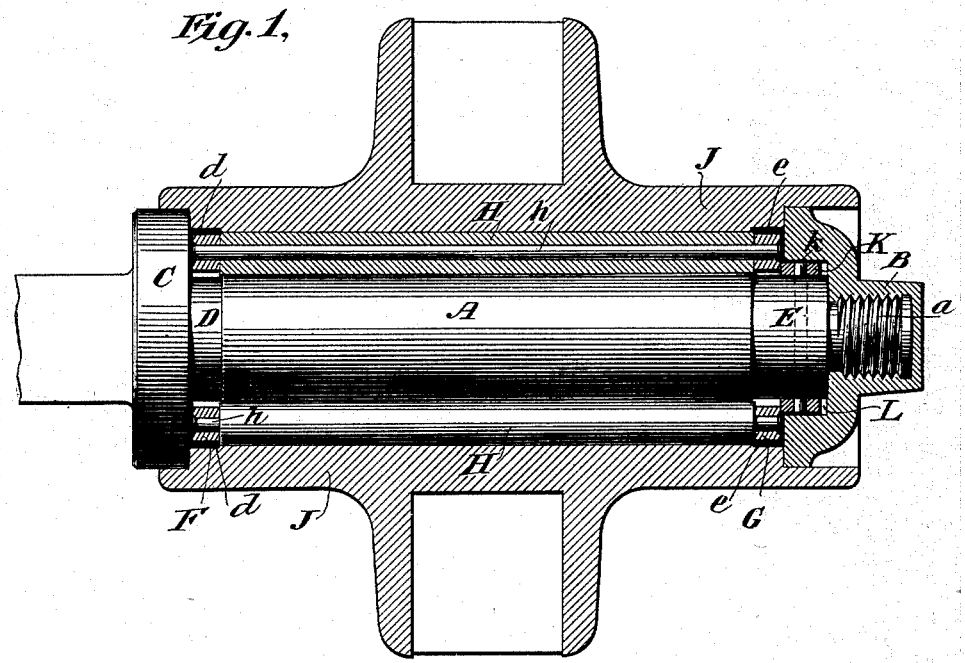
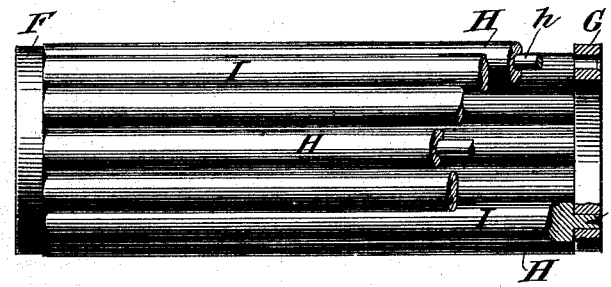
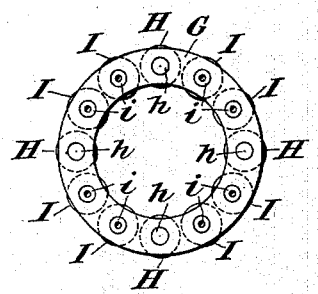
Witnesses
C. E. Ashley
I. H. W. L. Loyd.
Inventor
Ernest N. Wood,
By his Attorney.
Franklin L. Pope.

UNITED STATES PATENT OFFICE.

ERNEST NEWTON WOOD, OF LANESBOROUGH, MASSACHUSETTS.

AXLE-BOX.

SPECIFICATION forming part of Letters Patent No. 483,372, dated September 27, 1892.

Application filed April 26, 1892. Serial No. 430,746. (No model.)

*To all whom it may concern:*

Be it known that I, ERNEST NEWTON WOOD, a citizen of the United States, residing in Lanesborough, in the county of Berkshire and State of Massachusetts, have invented certain new and useful Improvements in Axle-Boxes, of which the following is a specification.

My invention relates to that class of axle-boxes in which antifriction devices are employed in order that the wheel may revolve upon the axle with as little friction and wear as possible.

My invention consists in providing anti-friction-rollers which are placed between the axle and the hub and are held in place by improved devices, as hereinafter particularly described.

In the accompanying drawings, Figure 1 is a side elevation of one end of an axle, showing a vehicle-hub or axle-box, the end nut of the axle, the washers or rings in which the antifriction-rollers are mounted being shown in section and the rollers being shown both in section and in elevation. Fig. 2 is a side elevation, partly in section, showing the rollers and the rings or washers in which they are mounted. Fig. 3 is an end elevation of the same, and Fig. 4 is a detail view illustrating a modification in the construction of the roller.

The journal A of the axle is of the ordinary construction and is provided at its outer end with a removable nut B, which works on the screw-threaded end $a$ of the axle. The inner end of the journal A of the axle is provided with the usual enlarged flange or collar C, and inside the flange or collar C is formed a shallow circumferential groove D. The outer end of the journal A is likewise turned down, as shown at E, to the same diameter as the groove D. These grooves D and E are designed to accommodate annular rings or washers F and G, which form supports or bearings for the rollers, as hereinafter explained. I have shown twelve of these rollers, although any convenient number may be used. They are mounted in the rings F G in close proximity and at equal distances from each other. The several rollers are all of the same external diameter, as well as of the same length. A certain number of them, as shown at H H H H, are made hollow from one end to the other and revolve freely upon steel rods or axes $h$, which pass longitudinally through them and to which they are closely fitted. These rods or axes $h$ are inserted into holes bored in the rings F and G, preferably at four equidistant radial points, and are firmly secured thereto by upsetting or riveting the ends, the holes being slightly countersunk for that purpose, as seen in Figs. 1, 2, and 4. The intermediate rollers I I, &c., are solid and have journals formed at each end, as best seen at $i$ in Fig. 2, which turn in bearings formed in the rings F and G. Thus when the structure is assembled the rods $h\,h$ serve to hold in place not only the rollers H H, which revolve upon them, but the intermediate rollers I I as well. The diameter of all the rollers is a little greater than the vertical cross-section of the rings F G, as will be seen by reference to Fig. 3. The weight of the vehicle therefore resting upon the axle A is transmitted directly through the rollers to the hub J, which closely encircles the rollers. The rings F and G, which revolve in the recesses D and E of the axle and in corresponding recesses $d$ and $e$, formed in the hub, do not sustain any pressure due to the weight of the vehicle, so that all unnecessary friction is avoided. The rollers and their supporting-rings having been properly assembled and placed upon the axle A, the structure is held in position thereon by a stationary bearing-ring K, Fig. 1, which may be secured in place by a pin $k$, driven diametrically through it and through the axle. A recess L is formed in the nut B for the accommodation of the bearing-ring K.

It will usually be found advantageous to construct the hollow rollers H H in a manner similar to that illustrated in Fig. 4. In this case each of said hollow rollers is subdivided into a convenient number of independent sections $H'\,H^2$, &c., which are placed side by side in immediate contact with each other and enveloping the whole length of the rod $h$, upon which they turn. One advantage of this construction is that it is less difficult to bore the short sections of the roller to adapt them for the reception of the central rod $n$. In case this construction is adopted, the subdivisions of the different rollers H H should vary from each other in length, so that the lines of division will "break joints" and not follow each other in the same track, by which provision a greater uniformity of wear will be secured.

I claim as my invention—

1. The combination of the journal-bearing with its circumferential grooves, the annular rings revolving in said grooves, the rollers mounted between said rings and turning upon bearings fixed therein, and the hub embracing said rollers and provided with internal grooves for accommodating said rings, as set forth.

2. The combination of the annular rings and the rods having their ends secured therein and serving the double purpose of supporting axles for a part of the rollers and as a means of securing the remaining rollers in position, as set forth.

3. The combination, with the annular rings, of the intermediate rollers journaled therein and the rods having their ends permanently secured therein for securing the same in position and the additional rollers revolving upon said rods, as set forth.

4. The combination, with the annular rings and the rollers mounted therein, of the circumferential grooves formed in the axle and in the interior surface of the hub for accommodating said rings, as set forth.

5. The combination, with the annular rings and the rollers mounted therein, of the circumferential grooves for accommodating said rings formed in the axle and in the interior surface of the hub, and the stationary bearing-ring secured upon the axle, as set forth.

6. The combination, with the nut B for securing the hub upon the axle, of the recess L, formed therein, and the stationary bearing-ring K upon the axle, as set forth.

In testimony whereof I have hereunto subscribed my name this 19th day of March, A. D. 1892.

ERNEST NEWTON WOOD.

Witnesses:
W. O. SMITH,
M. P. SPRAGUE.